United States Patent
Campbell et al.

(10) Patent No.: US 6,199,745 B1
(45) Date of Patent: Mar. 13, 2001

(54) WELDING HEAD

(75) Inventors: Craig L. Campbell, Maple Grove; Mark S. Fullen, St. Paul; Michael J. Skinner, Eden Prairie, all of MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/349,628

(22) Filed: Jul. 8, 1999

Related U.S. Application Data
(60) Provisional application No. 60/092,332, filed on Jul. 9, 1998.

(51) Int. Cl.[7] ............ B23K 20/12; B23K 31/02; B23K 37/00
(52) U.S. Cl. ............ 228/112.1; 228/2; 228/2.1; 228/114
(58) Field of Search ............ 228/2, 2.1, 112.1, 228/114

(56) References Cited

U.S. PATENT DOCUMENTS

| | | |
|---|---|---|
| 3,817,439 | 6/1974 | Kiwalle et al. ............ 228/2 |
| 3,949,896 | 4/1976 | Luc ............ 220/75 |
| 4,144,110 | 3/1979 | Luc ............ 156/73.5 |
| 5,460,317 | 10/1995 | Thomas et al. ............ 228/112.1 |
| 5,486,262 | 1/1996 | Searle ............ 156/580 |
| 5,518,562 | 5/1996 | Searle et al. ............ 156/73.8 |
| 5,558,265 | 9/1996 | Fix, Jr. ............ 228/2.3 |
| 5,678,749 | * 10/1997 | Pratt et al. ............ 228/2.1 |
| 5,697,544 | 12/1997 | Wykes ............ 228/2.1 |
| 5,713,507 | * 2/1998 | Holt et al. ............ 228/112.1 |
| 5,718,366 | * 2/1998 | Colligan ............ 228/112.1 |
| 5,769,306 | * 6/1998 | Pratt et al. ............ 228/112.1 |
| 5,893,507 | 4/1999 | Ding et al. ............ 228/2.1 |

* cited by examiner

*Primary Examiner*—Patrick Ryan
*Assistant Examiner*—Zidia T. Pittman
(74) *Attorney, Agent, or Firm*—Westman, Champlin & Kelly, PA (57) ABSTRACT

A welding head including upper and lower probe members and probe pin. The upper and lower probe members are independently actuatable and biased to follow the profile of a workpiece and supply a balance load to opposed surfaces of a workpiece during welding operation.

20 Claims, 10 Drawing Sheets

WELDING HEAD

CROSS-REFERENCE TO RELATED APPLICATIONS

The present application claims priority to Provisional Application Serial No. 60/092,332, filed Jul. 9, 1999, entitled "FEATURES OF A FRICTION STIR WELD", now abandoned.

Reference is hereby made to co-pending application Ser. No. 09/349,283 filed on even date herewith and entitled "CONTROL SYSTEM FOR FRICTION STIR WELDING".

BACKGROUND OF THE INVENTION

The present invention relates to a welding head. In particular, the present invention relates to a welding head for friction stir welding applications.

Friction stir welding is a process of welding component parts together using friction heat generated at a welding joint to form a plasticized region which solidifies joining workpiece sections. A welding head is used to generate friction heat along a welding joint. The welding head includes a welding probe which is inserted into a joint between workpiece sections. The probe includes a pin that is inserted into the joint and a shoulder which is urged against an upper surface of the workpiece. The pin and shoulder spin to generate friction heat to form a plasticize region along the joint for welding operation.

For welding operation, a workpiece is supported by a rigid table or backplate typically formed of a steel plate. Rigid backplate stabilizes the actuation force of the upper shoulder to maintain the integrity of the workpiece so that the workpiece does not bend or deform under the load. To maximize strength of the joint between workpiece sections, the welded portion should extend the entire thickness of the workpiece. To assure that the weld extends the entire thickness, sufficient friction heat must be generated between upper and lower surfaces of the workpiece so that the plasticized region extends between upper and lower surfaces of the workpiece .

Typically, the thickness of a workpiece can vary along the joint. Variations in the workpiece thickness can vary pin depth or extension into the workpiece joint. If pin depth does not extend sufficient thickness, the plasticized region does not extend the entire thickness of the workpiece causing stress notches in the joint. For a smaller thickness, pin can extend too close to the backplate so that workpiece becomes joined to the backplate as a result of the welding operation. These and other problems are addressed by the present invention.

SUMMARY OF THE INVENTION

The present invention relates to a welding head with adjustable probe or pin depth to compensate for variations in workpiece thickness. The welding probe includes an upper probe member and a lower member and a pin movably supported relative to the upper probe member. Upper and lower probe members are coupled to separate forge actuators and are urged against upper and lower surfaces of the workpiece. The pin and upper and lower probe members rotate to generate friction heat at the weld joint. The forging force of the upper and lower probe members generates friction heat at the upper and lower surfaces of the workpiece to provide sufficient friction heat through the thickness of the workpiece. The forging force on the upper and lower actuators is balanced to maintain the integrity of the workpiece and limit bending and distortion. The biased upper and lower probe members follow workpiece profile so that pin depth is adjusted based upon thickness of the workpiece at the joint.

DETAILED DESCRIPTION OF THE ILLUSTRATIVE EMBODIMENTS

Figure 1:
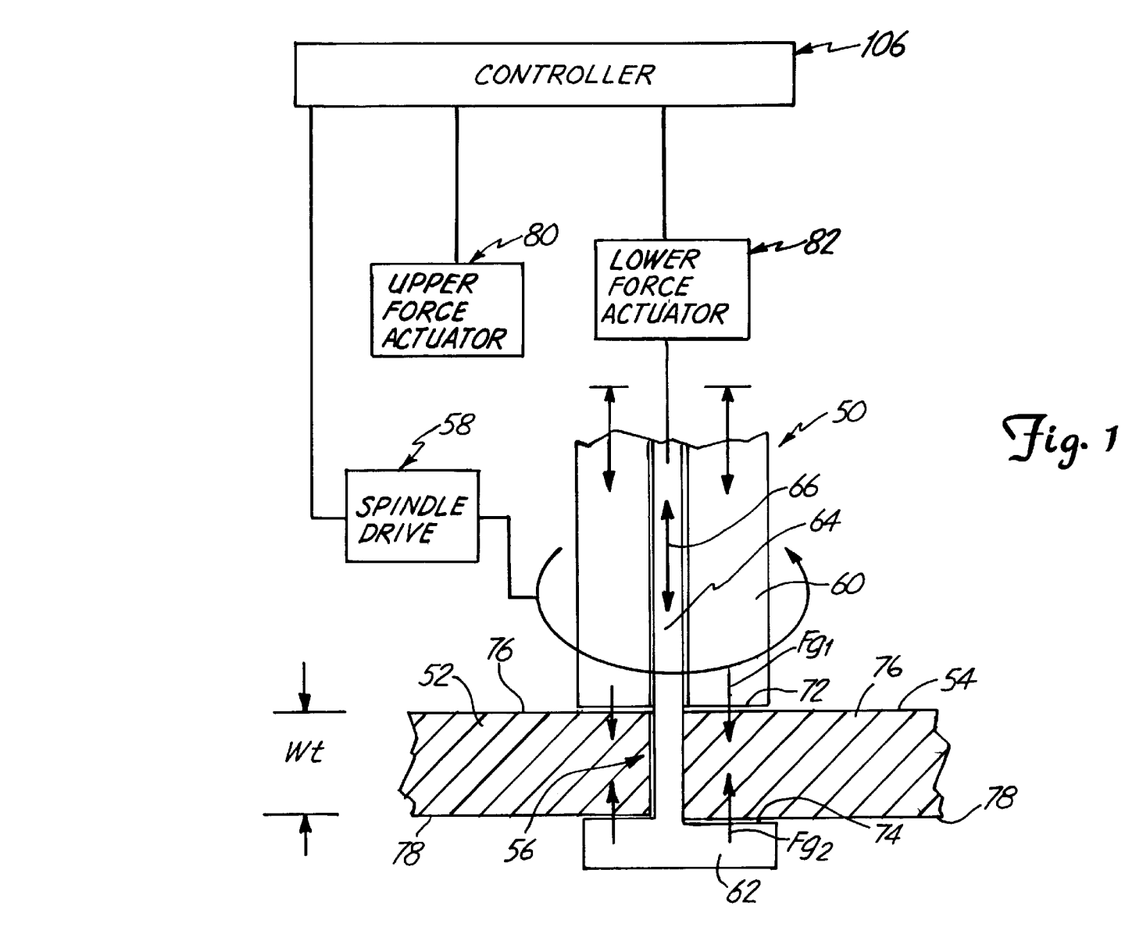
FIG. 1 is a schematic illustration of an embodiment of a welding head of the present invention.

FIG. 1 schematically illustrates an embodiment of a welding probe 50 for friction welding application. Welding probe 50 welds workpiece sections 52, 54 at joint 56. Welding probe 50 is connected to a spindle drive 58 to rotate probe 50 for welding operation. As shown welding probe 50 includes an upper probe member 60, a lower probe member 62 and a probe pin 64. As shown, lower probe member 62 is rigidly connected to probe pin 64 and is movable therewith. Lower probe member 62 and probe pin 64 are slideably supported as illustrated by arrow 66 relative to upper probe member 60 for adjusting pin 64 extension relative to upper probe member 60 for use for workpieces of various thickness and for compensating for thickness variations in a workpiece as will be explained.

As shown, upper probe member 60 includes an upper shoulder 72 and lower probe member 62 includes a lower shoulder 74. For operation, upper probe member 60 is supported so that shoulder 72 abuts an upper surface 76 of workpiece sections 52, 54. Pin 64 extends through joint 56 and shoulder 74 of lower probe member 62 abuts a lower surface 78 of the workpiece sections 52, 54.

An upper forge actuator 80 is coupled to the upper probe member 60 and a lower forge actuator 82 is coupled to the lower probe member 62 and pin 64. For welding operation probe 50 rotates and upper and lower forge actuators 80, 82 supply forging forces $Fg_1$, $Fg_2$ to upper and lower probe members 60, 62 as illustrated by arrows $Fg_1$, $Fg_2$ respectively.

Figure 2A:
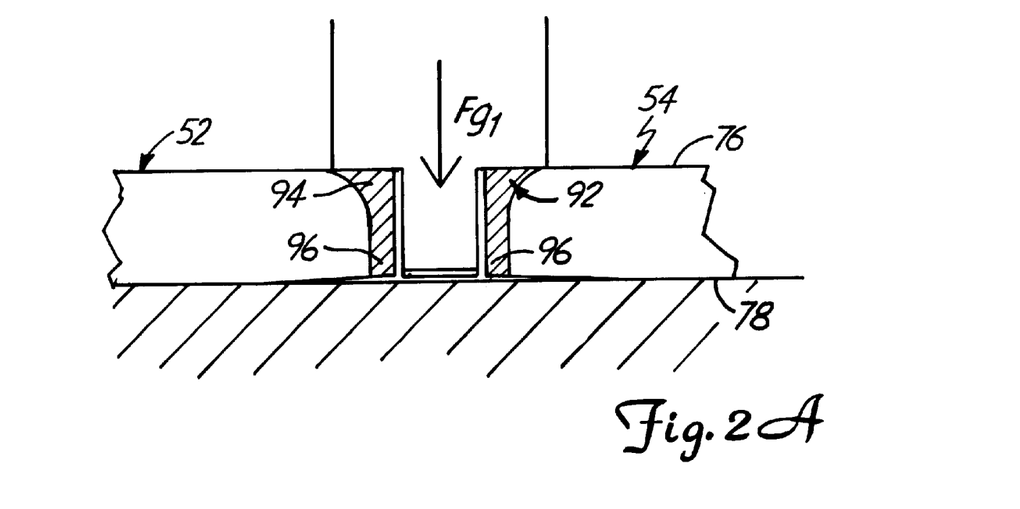
FIG. 2A is an illustration of a plasticized region for a prior art probe including an upper shoulder and fixed pin.

Rotation of pin 64 and upper and lower probe members 60, 62 generates friction heat to create a plasticize region for welding workpiece sections. To assure that the weld extends the thickness of the workpiece, probe should form a plasticize region that extends between upper and lower surfaces 76, 78 of the workpiece. In FIG. 2A, a profile of plasticize region 92 formed by a prior art probe tapers from a thicker region 94 at an upper surface 76 of the workpiece to a thin region 96 proximate to a lower surface 78 of the workpiece. Stress notches or root openings form if the weld does not extend the entire thickness of the workpiece.

Figure 2B:
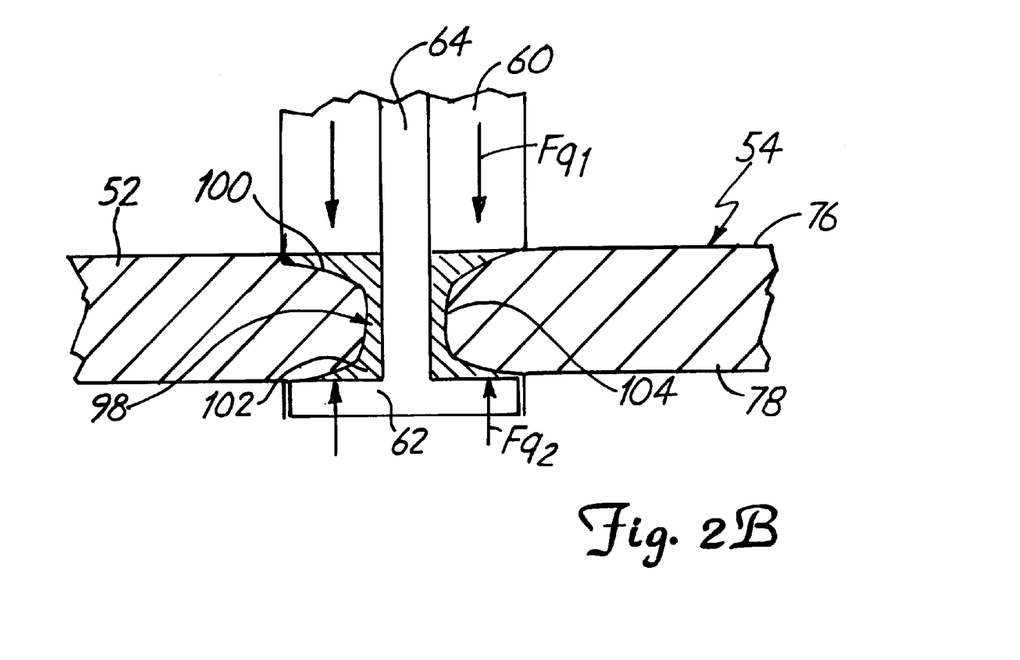
FIG. 2B is an illustration of a plasticized region for a probe including upper and lower probe members.

In contrast, as illustrated in FIG. 2B, upper and lower probe members 60, 60 form a plasticized region 98 that includes thicker regions 100, 102 at the upper and lower surfaces 76, 78 and a taper center region 104. The friction heat generated on the workpiece to form the plasticized region 98 is a function of the total forging force of the upper and lower probe members or $Fg_T=|Fg_1|+|Fg_2|$. Thus friction heat generated by the probe is increased by the lower probe member 62 operating in cooperation with the upper probe member 60.

Upper and lower forge actuators 80, 82 and spindle drive 58 are coupled to controller 106 as schematically illustrated in FIG. 1 for operation. Controller operates upper and lower forge actuators 80, 82 to maintain upper and lower probe members 60, 62 or shoulders 72, 74 in abutment with upper and lower surfaces of the workpiece to compensate for variations in workpiece thickness and profile and to provide a balanced load on opposed surfaces of the workpiece. Controller 106 can be a digital controller or an analog controller set to supply a balanced forging force for upper and lower actuators. A digital controller 106 includes a processor and memory for storing programmed instructions.

Figure 3:
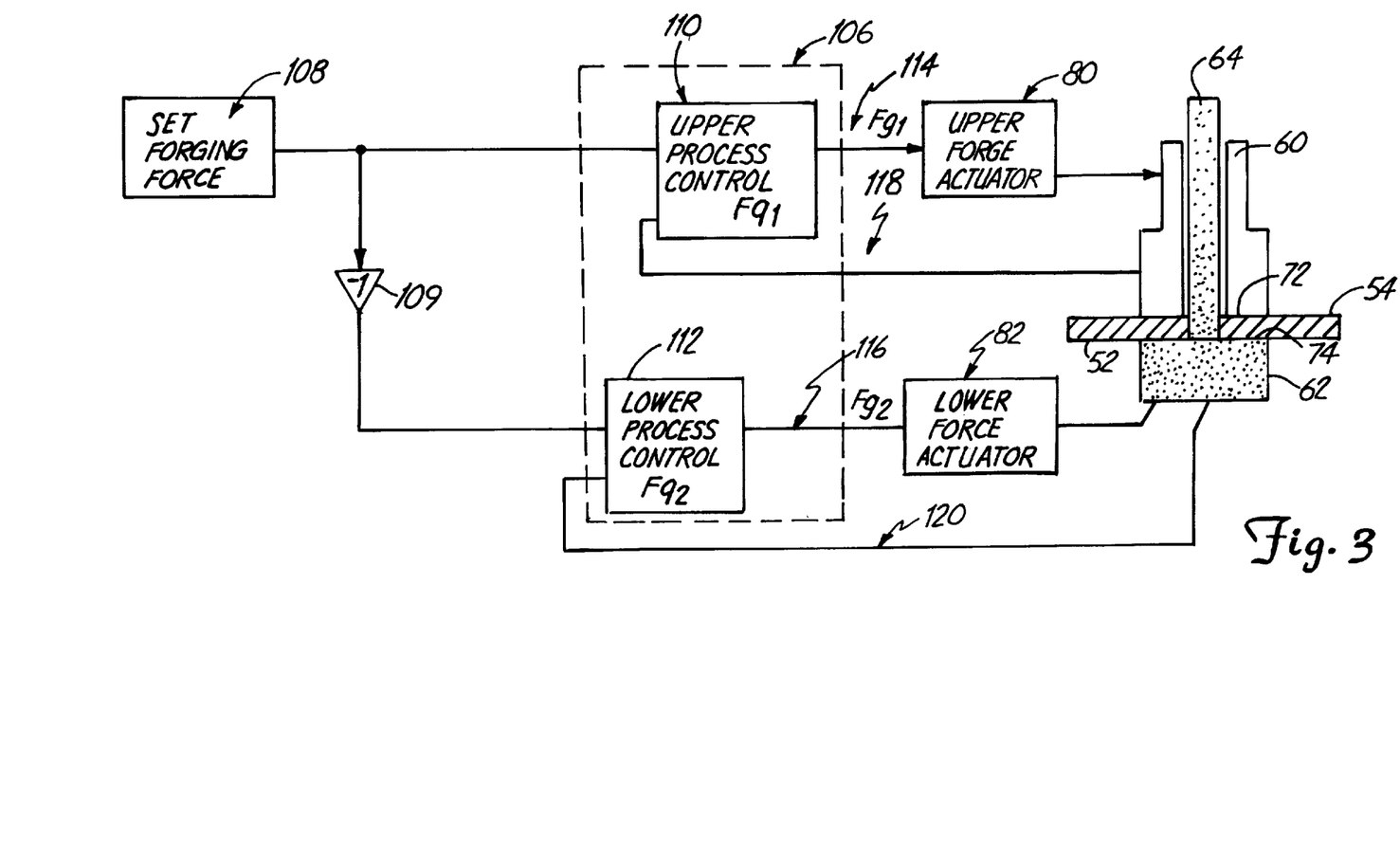
FIG. 3 is a schematic control feedback for forging force $Fg_1$ on upper probe member and forging force $Fg_2$ on lower probe member.

In particular, controller operates lower forge actuator 82 to maintain appropriate spacing between upper and lower probe members 60, 62 to adjust pin 64 depth relative to workpiece thickness and variations in workpiece thickness. Controller is programmed or set to supply balanced forging force $Fg_1=Fg_2$ to the upper and lower probe members 60, 62 to rigidly support the workpiece to reduce off axis loads to the workpiece and limit bending or distortion of the workpiece during welding operation. FIG. 3 illustrates a simplified embodiment for controlling operation of upper and lower forge actuators 80, 82. As shown in FIG. 3, controller 106 uses an input or command forging force 108, which is used to control upper and lower actuators 80, 82. In FIG. 3, input forging force $108=Fg_1$ and $Fg_2$ is the inverse as illustrated by block 109. In an alternative embodiment, input force $108=Fg_T$ and $Fg_1=Fg_T/2$ and $Fg_2=-Fg_T/2$.

Controller 106 includes upper and lower process control 110, 112 which provides operating control to upper and lower forge actuators 80, 82 as illustrated by lines 114, 116 based upon input parameters 108, 109 and control feedback 118, 120. During welding operation, feedback 118, 120 includes force feedback as will be explained to maintain a balanced load to the workpiece to limit deformation or bending of the workpiece. Control of the upper and lower probe members 60, 62 biases members 60, 62 against the workpiece to maintain proper pin 64 depth based upon workpiece thickness and variations in workpiece thickness. Thus, as described, welding probe provides a plasticized profile having thicker regions relative to upper and lower surfaces 76, 78 of the workpiece to provide a relatively rigid weld joint across the thickness of the workpiece joint, while rigidly supporting the workpiece to limit bending and distortion.

Figure 4:
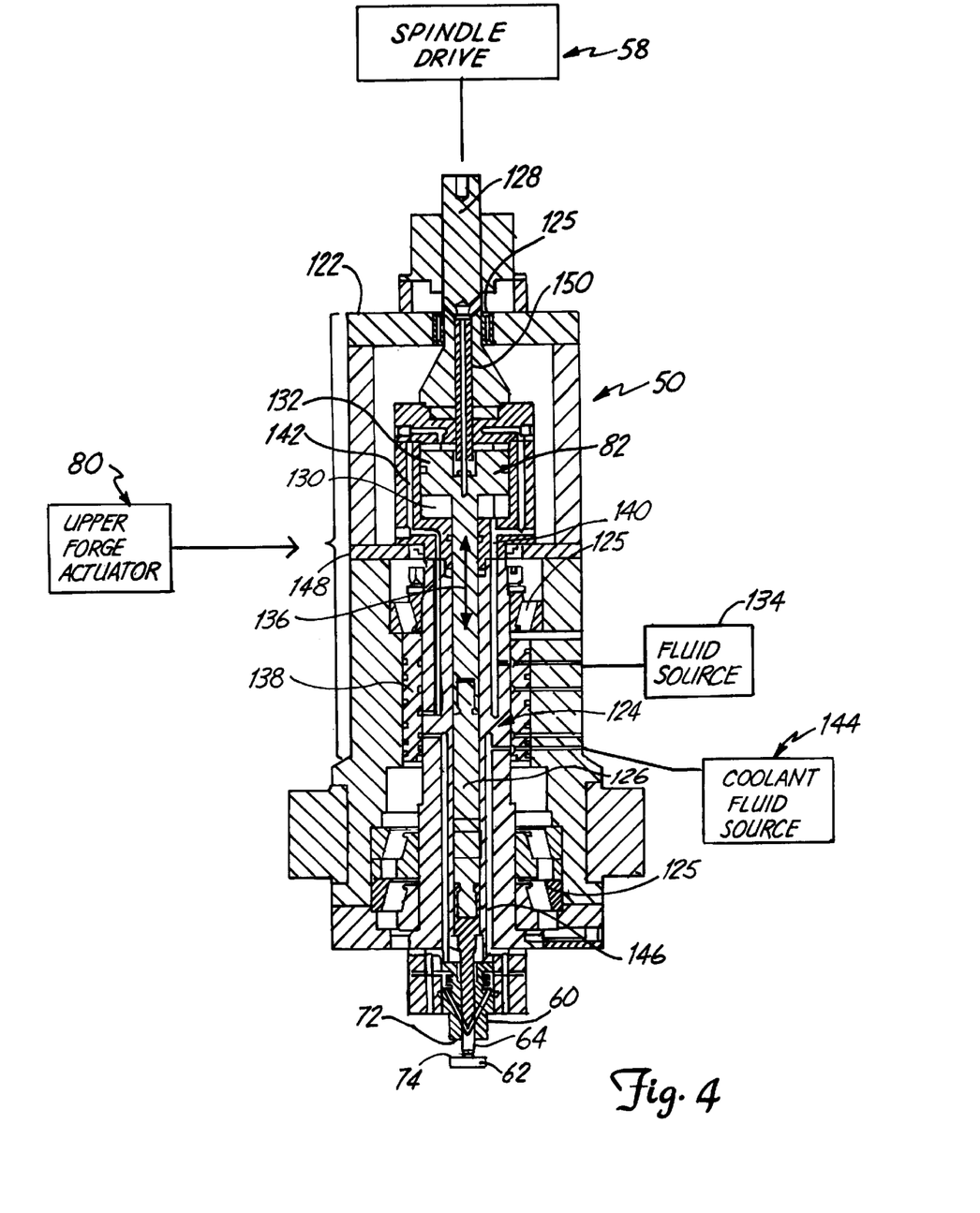
FIG. 4 is a cross sectional illustration of a welding head of the present invention.

FIG. 4 is a detailed cross-sectional view of an embodiment of a welding probe 50 including actuatable upper and lower probe members 60, 62. In the embodiment shown, probe 50 includes an outer housing 122 and an inner housing 124 rotationally connected to outer housing by bearings 125. Upper probe member 60 is formed by inner housing 124. Pin 64 is slidably supported in housing 124 via rod 126. Probe member 62 is connected to pin 64 to slidably support lower shoulder 74 relative to upper shoulder 72 formed by housing 124. Spindle shaft 128 is coupled to housing 124 to rotate housing 124 (upper probe member 60, lower probe member 62 and pin 64) by operation of spindle drive 58 for welding operation. In one embodiment, spindle drive 58 includes an inline torque transducer for spindle control. Spindle control includes simultaneous torque and RPM (revolutions per minute) control.

As shown schematically, upper forge actuator 80 is connected to outer housing 122 to position and actuator upper probe member 60 as will be explained. In the embodiment shown, lower forge actuator 82 is a fluid actuator supported in inner housing 124 and coupled to rod 126 connected to lower probe member 62 and pin 64. Fluid actuator includes an actuation chamber 130 and piston 132. Rod 126 is connected to piston 132 operable in chamber 130. Actuator fluid is delivered to chamber 130 from fluid source 134 for bi-directional movement as illustrated by arrow 136. Fluid is delivered from fluid source 134 to rotating housing 124 by fluid commutator or slip rings 138. Fluid is delivered through channels 140, 142 for bi-directional actuation as illustrated by arrow 136. Preferably, fluid source 134 is a hydraulic fluid although other fluids can be used.

Although a fluid actuator is shown, application is not limited to a fluid actuator, and alternate actuators can be used, such as an electrical or mechanical actuator, with a fluid or electrical actuator interface, for communication between the rotating probe and stationary housing for actuation. In the embodiment shown, cooling fluid is supplied from a cooling fluid source 144 to channels 146 in the probe through fluid commutator 138 for temperature control during welding operation. Housing 122 includes upper and lower portions separated by a sealing ring 148 for operating fluid containment.

As previously described force feedback 118, 120 is used for actuating control of upper and lower probe members 60, 62 and pin 64 to maintain a balance $Fg_1$ and $Fg_2$ on the workpiece as illustrated schematically in FIG. 1. Additionally, in the embodiment illustrated in FIG. 4, a displacement sensor 150 (for example, a linear voltage displacement transducer "LVDT") is coupled to rod 126 for position feedback control for pin 64 extension and separation distance between upper and lower probe members 60, 62 as will be explained.

Figure 5:
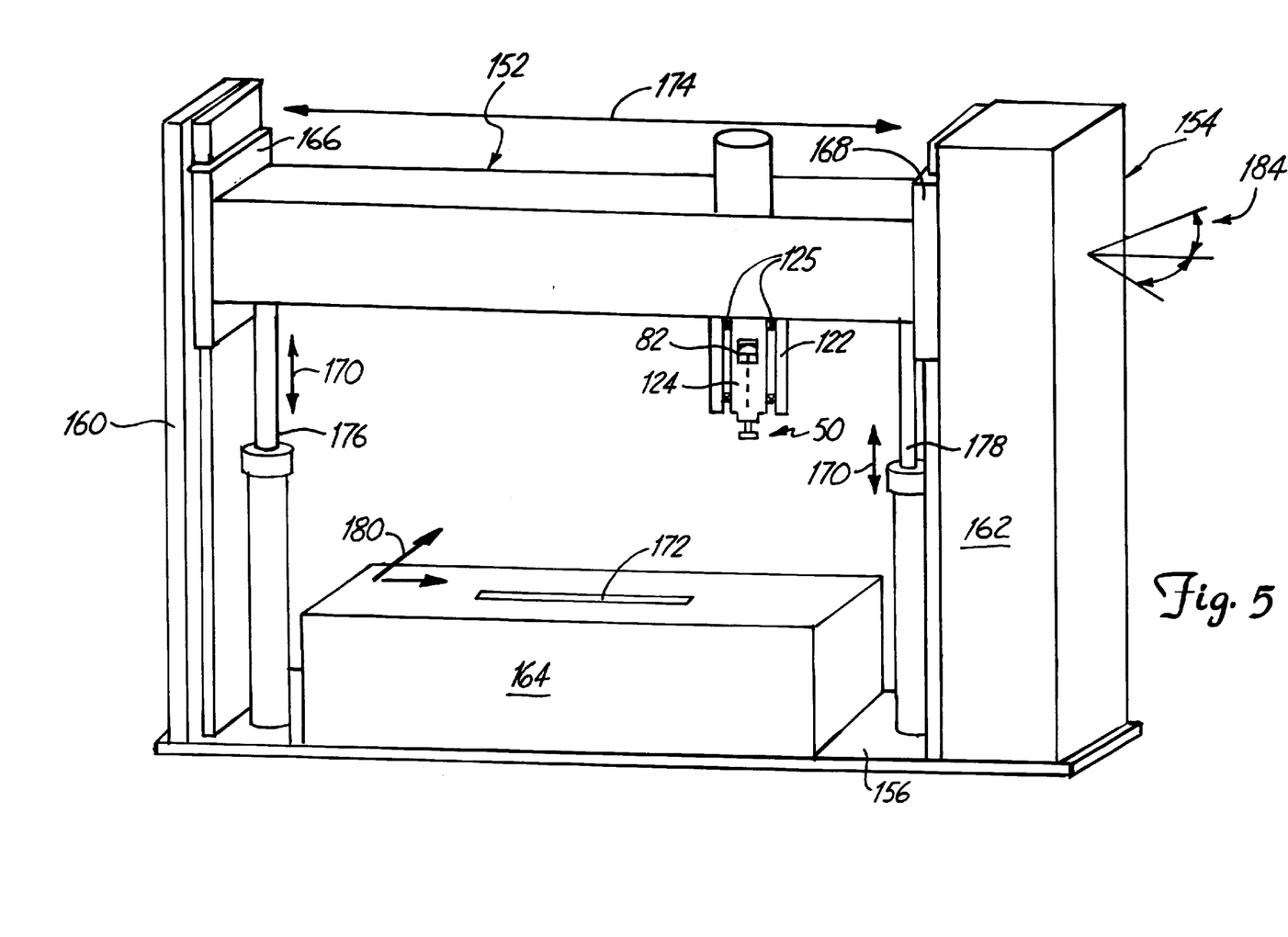
FIG. 5 is a perspective illustration of a fixture supporting a welding head of the present invention.

As shown in FIG. 5, for welding operation, probe housing 122 is supported for movement along a probe track 152 supported by a welding fixture 154. Fixture includes a base 156, and posts 160, 162 which extend from base 156 to support probe track 152 above a workpiece table or backplate 164. Probe track 152 is movably coupled to tracks 166, 168 along posts 160, 162 to raise and lower probe 50 as illustrated by arrow 170 for welding operation. Table 164 includes a groove 172 or alternately two separately spaced table sections can be used to support the workpiece. Workpiece joint is aligned with groove 172 or separation for placement of the lower probe member 62 underneath the workpiece supported by table 164. As described, probe track 152 supports probe 50 for movement along a welding joint of a workpiece supported by table 164 as illustrated by arrow 174.

Fluid actuators 176, 178 are coupled to probe track 152 to raise and lower track 152 and probe 50 as illustrated by arrow 170. Actuators 176, 178 position probe 50 relative to workpiece and supply forging force to upper probe member 60 through housing 122. Although a particular fixture is shown, application is not limited to the particular fixture. For example, table 164 can be movably supported relative to base 156 as illustrated by arrows 180 for probe placement along a welding joint. Bi-directional placement of the probe as illustrated by arrows 180 facilitates complex welding operation along a curved joint in addition to straight line welding along a straight joint. Operation of the actuators 176, 178 can be independently controlled to vary rake angle 184 of the probe for contour welding operations, as will be explained.

Figure 6:
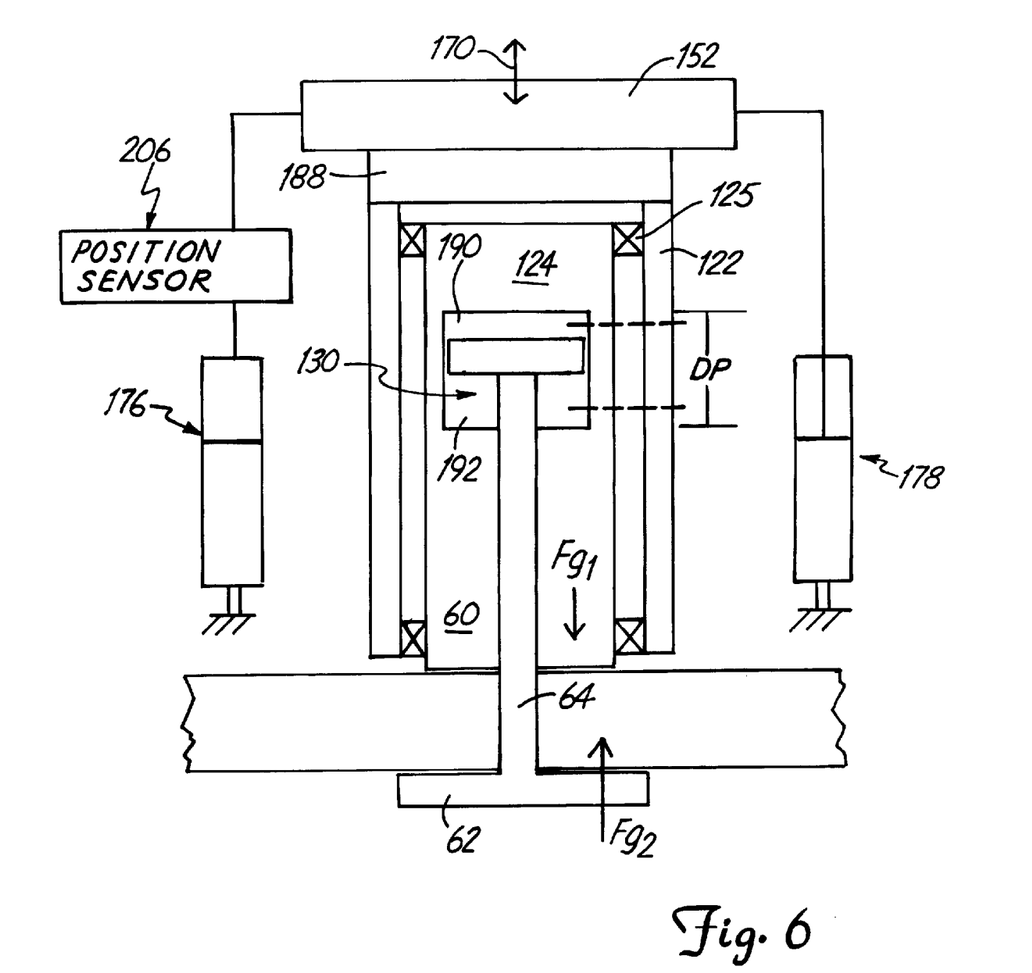
FIG. 6 is a schematic illustration for force feedback $Fg_1$ and $Fg_2$ of upper and lower probe members.

As shown schematically in FIG. 6, force feedback 118 for upper probe member 60 is measured by force transducer 188 connected in series with force actuator 80 (fluid actuators 176, 178) and upper probe member 60. Force feedback 120 for lower probe member 62 is measured by a pressure sensor assembly for measuring pressure differential between chamber portions 190, 192 of fluid actuator 82. Although particular force feedbacks 118, 120 are described, force feedback 118, 120 is not limited to the particular embodiment described.

Figure 7:
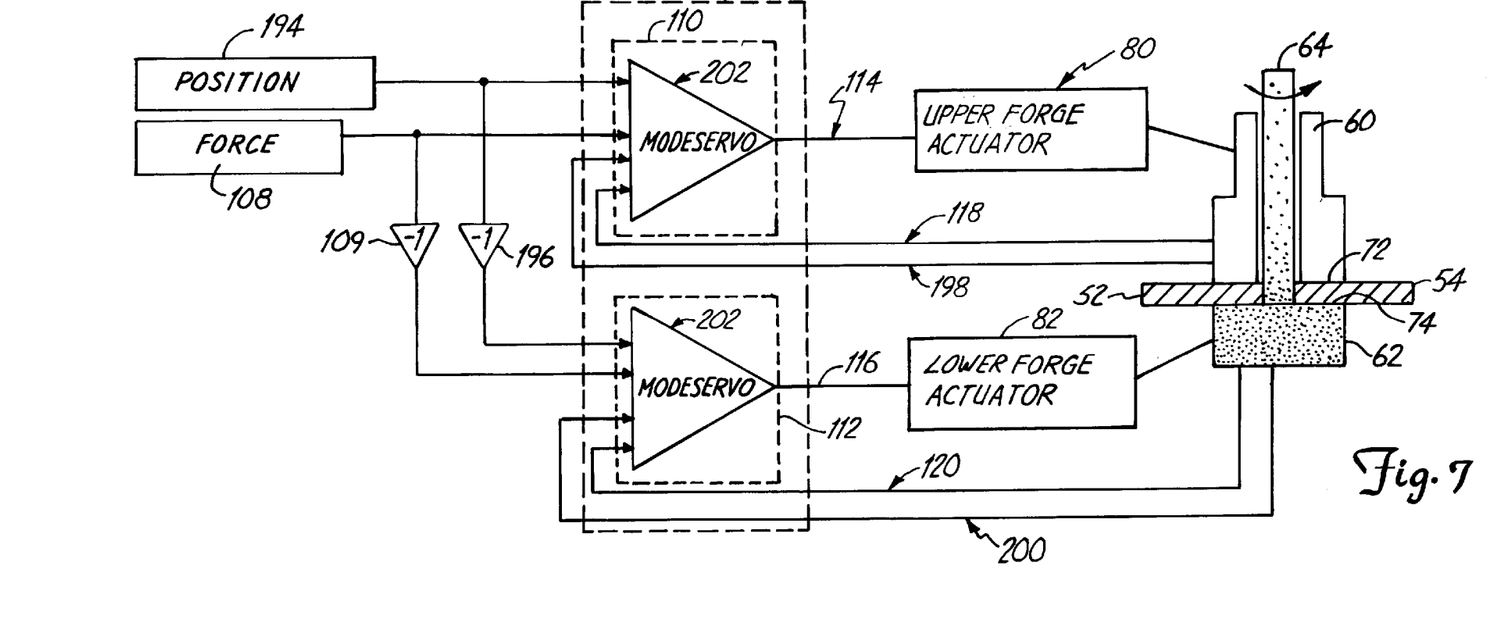
FIG. 7 is a schematic illustration of force and position control feedback for upper and lower probe members.

As previously explained, in one embodiment, position feedback from, for example, displacement sensor 150, can be used for probe control. FIG. 7 illustrates a control schematic for force and position control. As shown schematically, upper and lower process control 110, 112 receive and process force 108, 109 and position 194, 196 input or command and force 118, 120 and position feedback 198, 200. Upper and lower process control 110, 112 includes mode switching for switching between force and position control. Mode switching includes a mode controller 202 or operating actuator 80, 82 between force and position control to maintain force and position parameter within command parameters or limits.

Mode controller 202 switches mode control between force and position control based upon the force and position error between the program commands 108, 109, 194, 196 and feedback 118, 120, 198, 200. For example in FIG. 7, mode controller 202 provides force control to maintain force feedback relative to command parameters and switches to position if force feedback 118, 120 is within command parameters 108, 109 and provides position control to maintain position feedback within command parameters and switches to force control when position feedback 198, 200 is within command parameters. A proportional integrated controller (DID) provides force and position control and bumpless mode switching between force and position control.

Figure 8:
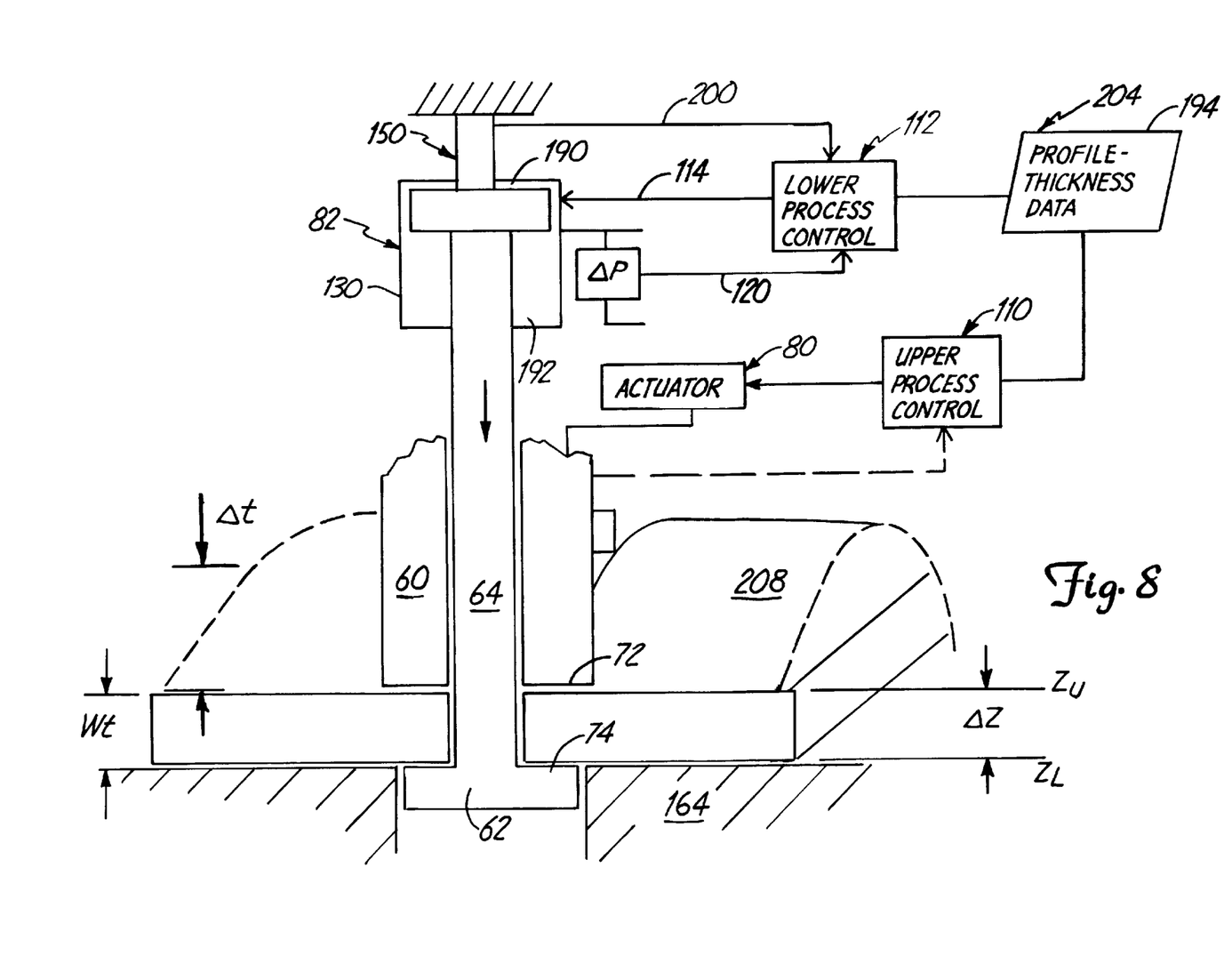
FIG. 8 is a detailed illustration of an operation control embodiment for upper and lower probe members.

As illustrated in FIG. 8, position feedback 198 can be used to maintain minimum separation $\Delta z$ between upper and lower probe members 60, 62 based upon workpiece thickness $\Delta t$. For example, $\Delta z$ can be controlled based upon preprogrammed command parameters based upon the profile of the workpiece. In one embodiment, upper and lower process control 110, 112 adjust the position of upper and lower probe members 60, 62 to adjust $\Delta z$ (separation between upper and lower probe members 60, 62) to correspond to workpiece thickness or minimum separation command parameter. In particular, the position of lower probe is fixed relative to a workpiece supported by table 164. For separation control, actuator 82 adjusts the position of upper probe member 62 for $\Delta z$, and the position of the probe member 60 is also adjusted the same increment as lower probe member 62 by actuator 80 to compensate for the adjustment of lower probe member 62 to maintain the elevation of lower probe member 62 aligned with table 164.

Position feedback can be used to compensate for profile or dimension changes in the workpiece based upon position commands. As shown in FIG. 8, upper and lower probe members 60, 62 can be adjusted relative to workpiece profile data 204. Workpiece profile data $\Delta z$ 204 can be measured or downloaded off-line or during the welding process by various sensors such as optical sensors to provide position commands 194 for operation. For example, the thickness of the workpiece may fluctuate or the thickness may increase $\Delta t$. To compensate for profile variations, lower process control 112 operates forge actuator 82 based upon position commands for the workpiece profile so that the separation distance of upper and lower probe members 60, 62 is $$\Delta z = t + \Delta t$$

where:

$\Delta z$—is the separation distance between upper and lower probe members 60, 62 t—is the original workpiece thickness; and $\Delta t$—is the thickness change in the workpiece.

For a fixed support, upper process control 110 operates actuator 80 to adjust the position of upper probe member 60 relative to lower probe member 62 to maintain the elevation of lower probe 62 aligned with table 164 as follows $$zu_2 = zu_1 + \Delta t$$

where:

$zu_2$—is the adjusted position of the upper probe;

$zu_1$—is the original position of upper probe; and $\Delta t$—is the workpiece thickness change.

For operation outside a fixed reference frame (relative to table 164), position feedback 198, 200 from upper and lower probe members 60, 62, as illustrated in FIG. 7, and position commands can be used by controllers for placement of upper and lower probe members in abutment with upper and lower workpiece surfaces 76, 78. For example, $z_u$, $Z_1$ and $\Delta z$ can be used for placement of upper and lower probe members 60, 62 based upon position feedback $Z_U$, $\Delta z$ and position commands for $z_u$, $\Delta z$ where:

$\Delta z$—is the displacement measurement of sensor 150 corresponding to separation of upper and lower probe members 60, 62;

$z_u$—is the position of upper probe member measured relative to elevation of housing 122 based upon measurement by position sensor 206 shown in FIG. 6; and $z_1$—is the position of the lower probe member calculated based upon $z_u + \Delta z$.

Figure 9:
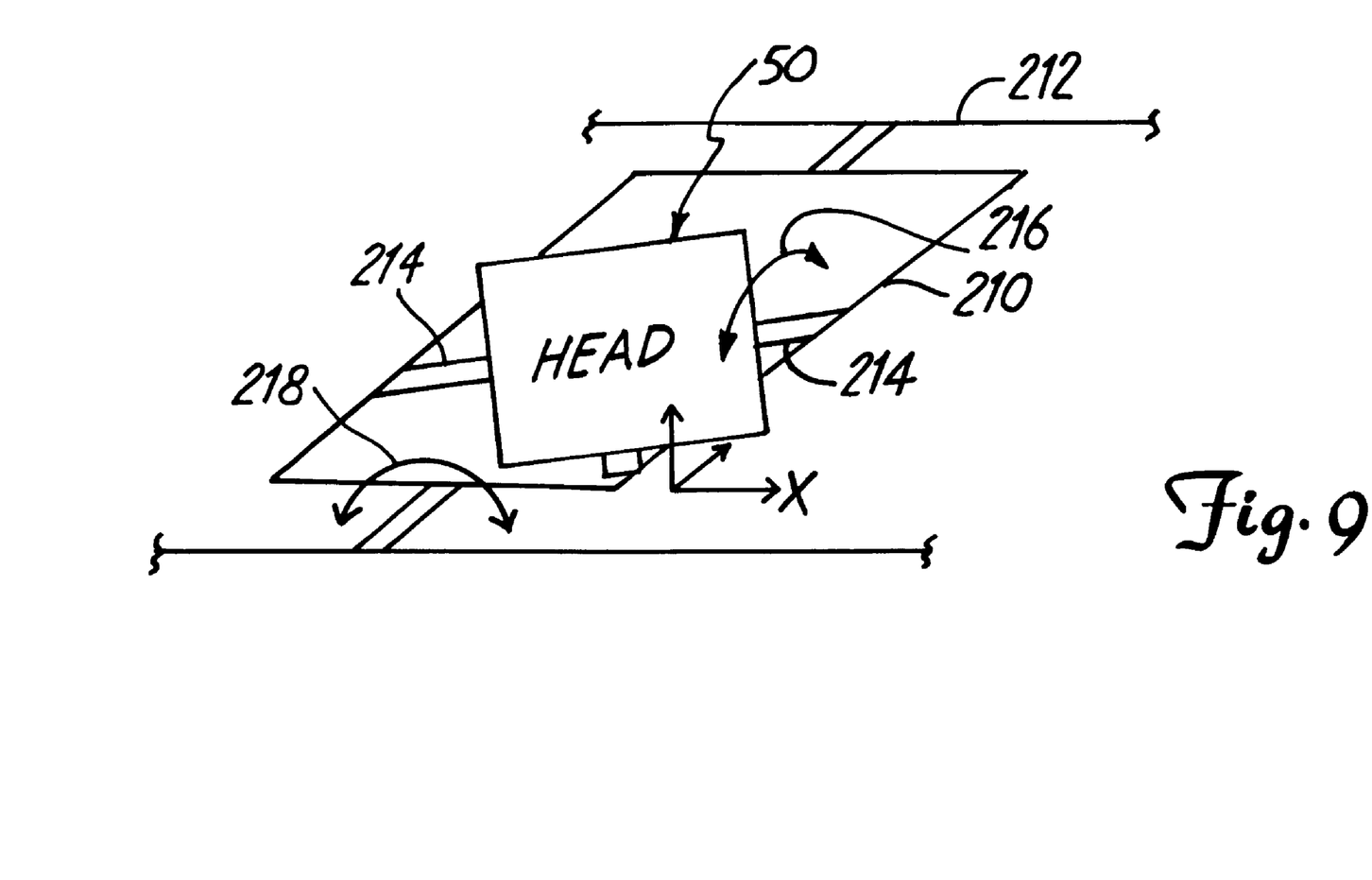
FIG. 9 is a schematic illustration of a flexible mounting assembly for a welding head to follow the contour of shaped forms or components.
Figure 10:
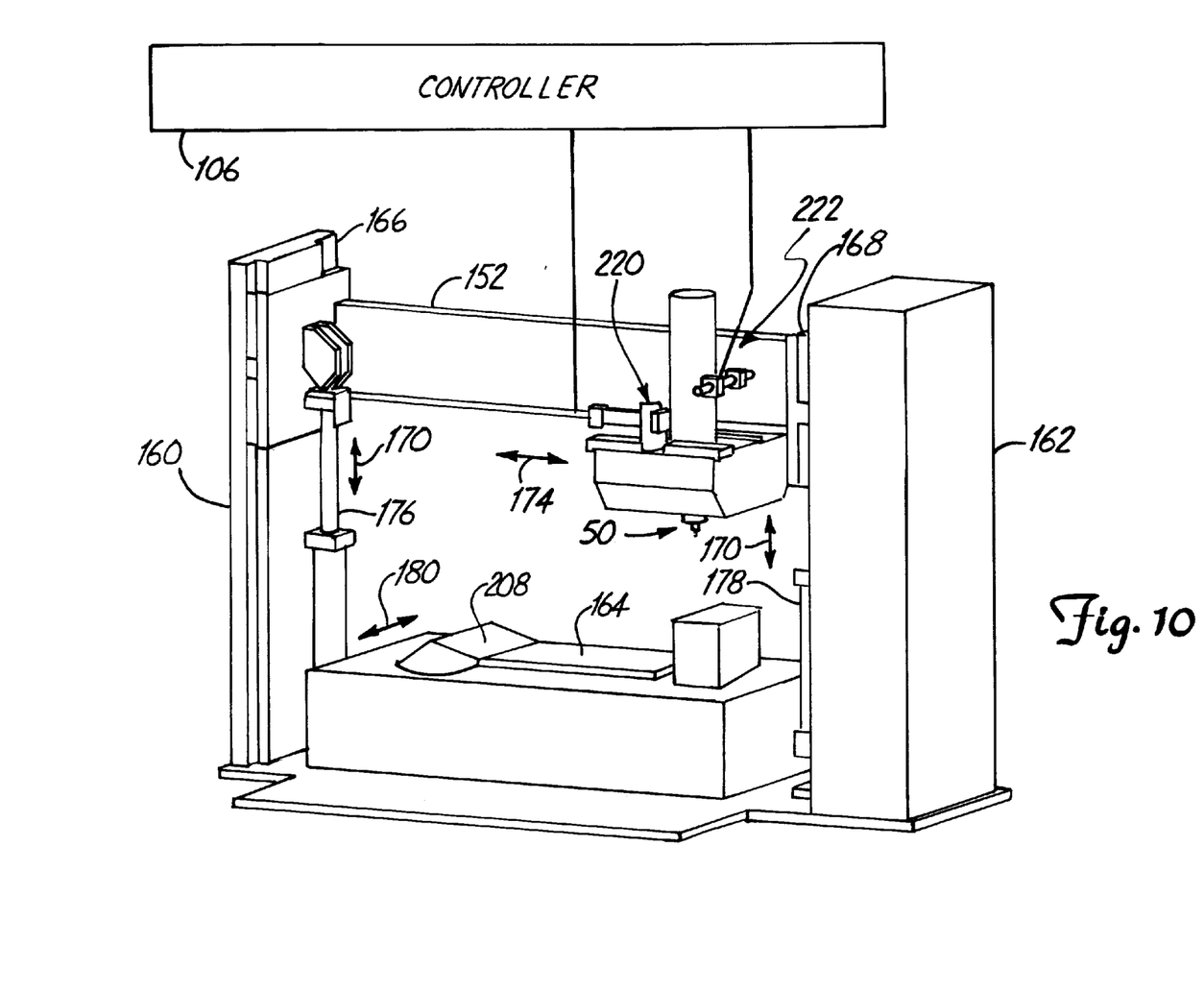
FIG. 10 is a perspective illustration of a flexible mounting fixture supporting a welding head.

Position commands for $z_u$, $z_1$, and $\Delta z$ can be derived from workpiece image or profile data which is uploaded to controller memory for execution or can be derived during the welding process via various sensors such as laser or optical sensors. As shown in FIGS. 9–10, in one embodiment, head is flexibly supported to flexibly couple the head (upper and lower probe members) to follow the contour of the workpiece for adapting head 50 for welding complex shapes and forms. In FIG. 9, head 50 is flexibly supported to pitch and roll relative to an x axis by first and second frame members 210, 212 for sloped or contour welding of surface 208. Head 50 is pivotally connected first frame member at trunions 214 to roll relative to the x-axis as illustrated by arrow 216. Frame member 210 is pivotally connected to frame member 212 to support the head 50 to pitch as illustrated by arrow 218. As shown in FIG. 10, pitch and roll actuators 220, 222 adjust the position of the head 50 so that the surface of the head 50 (for example, upper and lower shoulders 72, 74) are normal to the surface of the workpiece for contour welding via operation by controller 106 based upon programmed data or profile measurements received during the welding operation via optical or laser sensors.

Although the present invention has been described with reference to preferred embodiments, workers skilled in the art will recognize that changes may be made in form and detail without departing from the spirit and scope of the invention. Although probe members have been described relative to an upper and lower orientation, it should be understood, that probe members are not restricted to an upper and lower orientation and the upper and lower probe members can be oriented in any opposed relation.

What is claimed is:

1. A welding apparatus comprising:
   a first rotating probe member having a first shoulder oriented in a first direction;
   a second rotating probe member movable relative to the first probe member and having a second shoulder oriented in a second direction opposite to the first shoulder and the first and second shoulders spaced to form a gap therebetween;
   a probe pin coupled to one of the first or second probe members and rotatable therewith and operable in the gap between first and second shoulders;
   a first actuator coupled to the first probe member and operable to provide a first operating force to the first probe member in the first direction;
   a second actuator coupled to the second probe member and operable to provide a second operating force to the second probe member in the second direction opposite to the first direction; and
   a controller operably coupled to the first and second actuators and configured to control the first and second actuators to provide balanced first and second operating forces in the opposed first and second directions to form a self reacting welding probe.

2. The welding apparatus of claim 1 including
   a first force feedback coupled to the controller and the first actuator; and
   a second force feedback coupled to the controller and the second actuator and the controller controlling the first and second actuators to provide balanced first and second operating forces to form the self reacting welding probe based upon the first and second force feedback.

3. The welding apparatus of claim 2 wherein the controller controls the dimension of the gap between the first and second shoulders based upon force feedback for the first and second actuators to provide a desired separation between the first and second shoulders based upon workpiece thickness.

4. The welding apparatus of claim 2 wherein at least one of the first or second force feedback is measured by a force transducer.

5. The welding apparatus of claim 2 wherein at least one of the first or second force feedback is measured by actuating pressure of the respective first or second actuator.

6. The welding apparatus of claim 1 including position feedback coupled to the first and second probe members and the controller is configured to control the dimension of the gap between the first and second shoulders based upon the position feedback for the first and second probe members.

7. The welding apparatus of claim 1 including force feedback coupled to the first and second actuators and the controller and position feedback coupled to the first and second probe members and the controller is configured to control the dimension of the gap between the first and second shoulders based upon the force feedback and the position feedback based upon workpiece thickness.

8. The welding apparatus of claim 7 wherein the controller is set to mode switch between force and position control.

9. The welding apparatus of claim 1 wherein the controller receives position commands for at least one of $\Delta z$, $z_1$ or $z_2$ wherein $\Delta z$ is a separation distance between the first and second probe members; $z_1$ is the position of the first probe member and $z_2$ is the position of the second probe member to control the dimension of the gap between the first and second shoulders.

10. The welding apparatus of claim 6 wherein the controller includes profile data and the controller is configured to control the position of the first and second probe members based upon the profile data and the position feedback.

11. The welding apparatus of claim 10 wherein the profile data includes a memory stored image of a profile of a workpiece.

12. A welding head comprising:
    a housing;
    a rotating probe rotationally coupled to the housing including:
       a rotating first probe member having a first shoulder oriented in a first direction;
       a rotating second probe member movable relative to the first probe member and having a second shoulder oriented in a second direction opposite to the first shoulder and the first and second shoulders being spaced to form a gap therebetween;
       a probe pin coupled to the second probe member and rotatable therewith in the gap between the first and second shoulders;
       an actuator coupled to the probe pin and the second probe member to supply a forging force to the second shoulder of the second probe member; and
       an actuator interface member between the housing and the rotating probe to operate the actuator in the rotating probe.

13. The welding head of claim 12 wherein the actuator is a fluid actuator and the actuator interface is a fluid commutator for fluid interface between a fluid source and the fluid actuator.

14. The welding head of claim 12 including a displacement sensor coupled to the probe pin to measure the gap between first and second shoulders.

15. The welding head of claim 13 including a pressure sensor assembly coupled to a fluid actuator chamber of the fluid actuator to measure actuation pressure to control operation of the second probe member.

16. The welding head of claim 12 including cooling channels in the rotating probe and a fluid interface from a fluid source to the cooling channels in the rotating probe to deliver cooling fluid to the rotating probe for welding operation.

17. A method for welding a joint between first and second workpiece sections comprising steps of:
    locating a rotating probe including a first probe member having a first shoulder oriented in a first direction and a second probe member having a second shoulder oriented in a second direction opposite to the first shoulder in the joint between workpiece sections so that the first shoulder abuts first surfaces of the first and second workpiece sections and the second shoulder abuts second surfaces of the first and second workpiece sections opposite the first surfaces of the workpiece sections; and rotating the probe while supplying a balanced force to the first and second probe members to provide a balanced force on opposed first and second surfaces of the workpiece sections for self-reacting welding operation.

18. The method of claim 17 further comprising the steps of:

providing force feedback for the first and second probe members; and adjusting the force on the first and second probe members based upon the force feedback.

19. The method of claim 17 further comprising the step of:

adjusting a separation distance between the first and second probe members relative to thickness of the workpiece sections.

20. The welding apparatus of claim 1 wherein the probe pin is rigidly connected to the second probe member and the first probe member includes a channel and the probe pin is slidably supported in the channel to longitudinally move relative to the first probe member to adjust the gap between the first and second shoulders of the first and second probe members.

* * * * *